Dec. 30, 1969 C. A. VOSSBERG 3,487,214

MEASURING APPARATUS FOR OBVIATING THE EFFECTS OF NOISE ON INFORMATION SIGNALS

Filed Jan. 10, 1966 2 Sheets-Sheet 1

INVENTOR
CARL A. VOSSBERG

BY Kenyon Palmer Stewart & Estabrook

ATTORNEYS.

MEASURING APPARATUS FOR OBVIATING THE EFFECTS OF NOISE ON INFORMATION SIGNALS
Filed Jan. 10, 1966
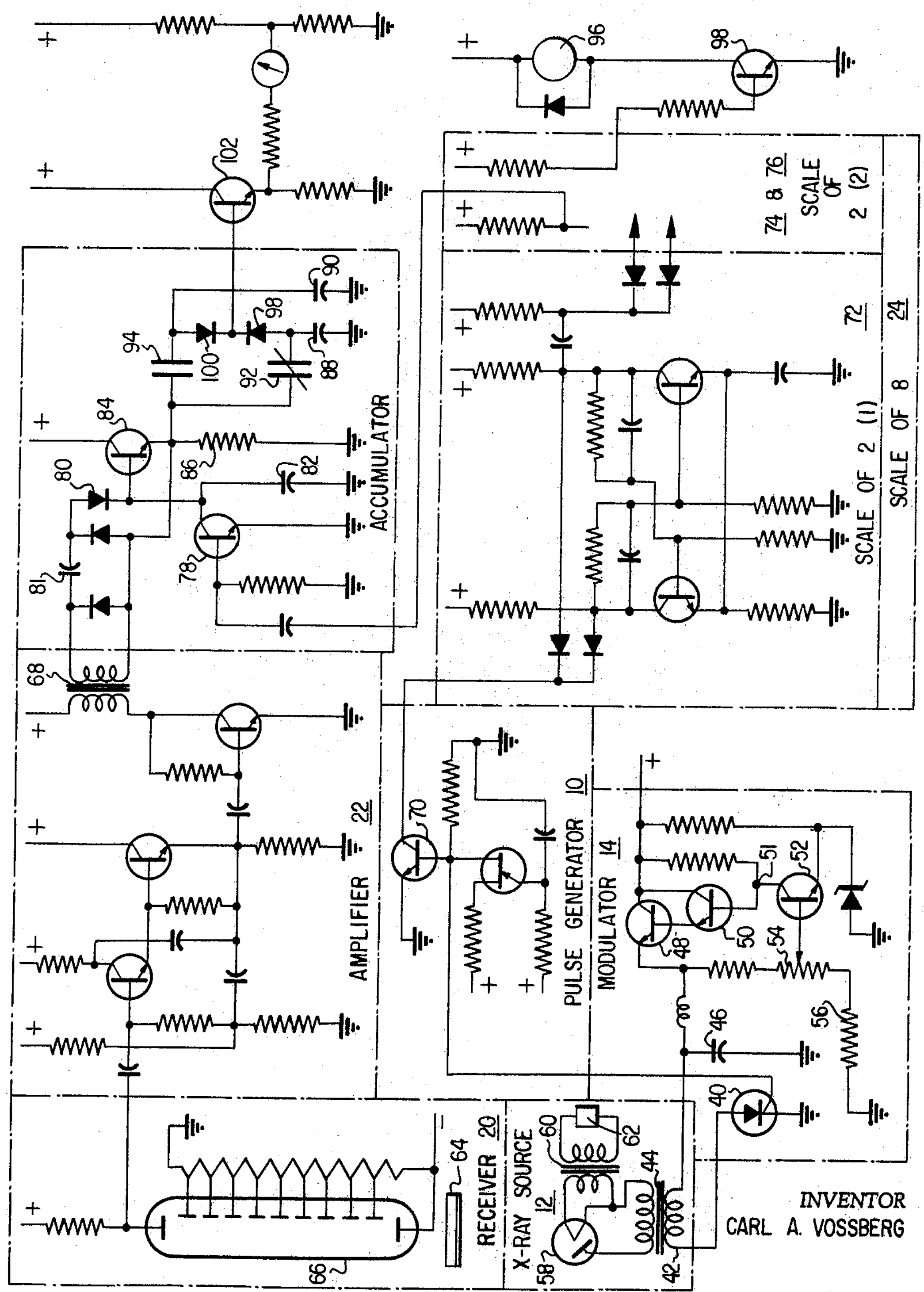

3,487,214

MEASURING APPARATUS FOR OBVIATING THE EFFECTS OF NOISE ON INFORMATION SIGNALS

Carl A. Vossberg, P.O. Box 637, Umatilla, Fla. 32784

Filed Jan. 10, 1966, Ser. No. 519,747
Int. Cl. G01t *1/16*
U.S. Cl. 250—83.3 14 Claims

ABSTRACT OF THE DISCLOSURE

There is disclosed herein a continuous measuring system that is capable of reducing the effects of noise on signals that are representative of a feature of a specimen being measured. A plurality of storage means are disclosed for sequentially accumulating and storing said signals with additional means being utilized for the purpose of selectively applying one of said storage means to a utilization deivce.

This invention relates to a continuous measuring apparatus and in particular to a new and improved circuit for reducing noise and other extraneous signal information from a signal detected as the result of measuring a specific qualitative feature of an article under test.

Most article testing systems subject the article to be tested to some form of energy, which energy is altered or modulated by the article being tested with the modulated energy being used by a measuring system or operating system to give an indication of some qualitative or quantitative feature of the article under test. In the alternative, the signal may be used to drive or control apparatus utilized in conjunction with the article or object under test, e.g., the article may be sheet metal being rolled to a specified degree of thickness between rotating rolls; in such a case the signal would be used to control the degree of pressure exerted by the rolls on the sheet metal. In order to achieve an accurate representation of the quality or quantity being tested, it is necessary that the modulated signal received from the object under study be an accurate representation of the measured quantity, and that it be void of all extraneous signals such as noise and the like.

In most measuring systems, noise signals and other interfering electronic signals are introduced into the measured signal through such instrumentalities as shot and thermal agitation in the detection and amplifying circuits, varying supply voltages, unstable amplifier gains and the like. Further extraneous information is introduced into the detected signal by the vary process of detecting the quantity or quality to be measured. For example, if X-rays are passed through a specimen, the strength of the detected rays may be of such a low level that the other instrumentalities of error mentioned heretofore may periodically dominate the signal, outside hash may be superimposed on the signal, etc., and thus, provide an inaccurate measured response in the output circuits. Similarly, measuring systems utilizing triggered sources of light, heat energy, sonics, and the like are subjected to random variations because of the enumerated and other extraneous factors that enter into the transmission of the primary signal and the detection and amplification of the modulated signal. Frequently the product characteristics are randomly varying and it may be desirable to measure the average value. It will be understood that although pulse circuits are shown and described the invention is not limited to such circuits in that continuous measuring circuits may be used to sample periods instead of pulses. The prior art has generally disclosed integrating networks used after detection circuitry to provide, e.g., a measure of thickness of an object under test. Such systems introduce a time delay due to the constants of the integrating circuits between detection and display. The present invention averages random variations whether they be superimposed on pulse or continuous signals and whether the random variations themselves are continuous or discontinuous by taking a number of rapid measurements for a period and at the end of the period totaling the measurements. The total value achieved whether pulses per period are used or a continuous signal per period is used will be proportional to the average detected value just as long as the same number of measurements are always taken. In this manner noise and other random fluctuations are averaged out, and the average response is available for display or use immediately as opposed to the inherent delays of the prior art.

It is an object of this invention to provide new and novel means for reducing noise and other extraneous signals from a signal representative of a measured quantity or quality of an article being tested.

It is another object of this invention to provide new and novel circuit means for reducing noise and extraneous signal information superimposed upon an information signal representative of a measured quantity or quality of an article under test and for improving the response time of measuring systems through the elimination of filtering networks.

It is a further object of this invention to provide a new and novel measuring circuit for adding and storing signals representative of measured quantities in a plurality of groups and for adding and storing said groups in order to reduce noise and extraneous signals from the measured quantity.

These and other objects and advantages of the invention will be apparent from a reading of the following description in conjunction with the accompanying drawings in which:

FIGURE 3 is a schematic diagram of a modified version of the circuit shown in block form in FIGURE 1.

Figure 1:
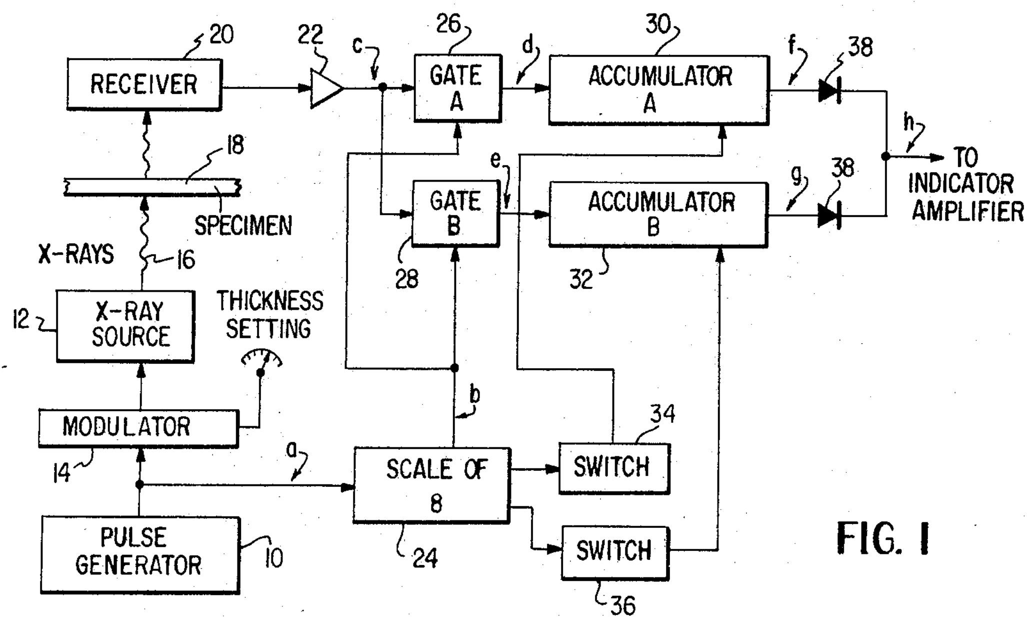
FIGURE 1 is a block diagram of a specific embodiment of the invention.
Figure 2:
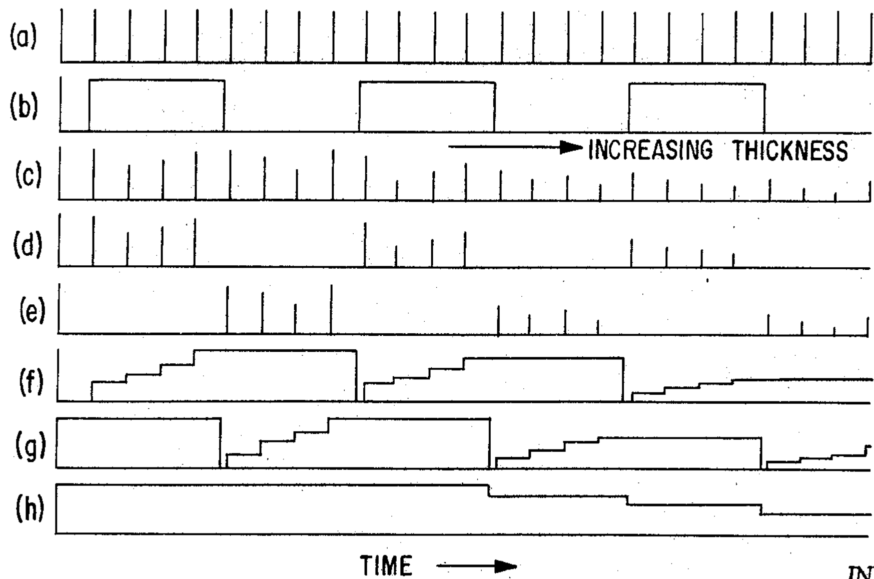
FIGURE 2 is an oscillogram representation of the signals appearing at various points in the block diagram of FIGURE 1.

Referring now to FIGURES 1 and 2, a preferred embodiment of the circuits utilized in the present invention and the wave forms to be seen at various points within the circuits are shown in block and wave form diagrams. The following description will be given with reference to measuring apparatus utilized for measuring the thickness of an object. It is to be understood, however, that the invention is not restricted to devices for measuring thickness and can be utilized, in fact, with most forms of measuring apparatus utilizing electronic detection equipment. For example, instead of an X-ray source of measuring energy, the source may be visible or invisible light, sonics, thermal energy, and the like.

The source may be continuous or discontinuous, the only requirement being that the detected signal be capable of being chopped and grouped into time displaced signal groups.

In a preferred embodiment, a pulse generator 10 generates a series of pulses at constant amplitude and repetition rate as shown in FIGURE 2*a*. These pulses are utilized to drive a source of X-rays 12 through a modulator 14. The X-ray source 12 emits a pulsed beam 16 which is made to impinge on a target 18, the thickness or other property of which is to be measured. The beam 16 is attenuated by the target 18 and the attenuated or thickness modulated X-ray beam is detected by a receiver 20. The receiver 20 is utilized to convert the modulated beam into electronic pulses which are subsequently amplified in an amplifier 22. The output of the amplifier 22 is a series of pulses having a repetition rate equal to or synchronized with the repetition rate of the pulse generator 10. The amplitude of the detected pulses is proportional to the strength of the beam detected in the receiver 20 which in turn is inversely proportional to the thickness of the target 18. A representative series of these pulses is shown in FIGURE 2*c*. About halfway in the diagram the thickness of the specimen begins to and progressively increases resulting in a diminishing of signal pulses. If an alternative embodiment were used with the source of X-rays being continuous, then the information depicted in FIGURE 2*c* would be a continuous voltage or current signal varying continuously in accordance with and due to noise or other random fluctuations. In such a case the peaks of the pulses shown in FIGURE 2*c* would be joined by a continuous curve. The detected pulse information is shown as affected by extraneous signals such as noise, but the information is usable in the preferred embodiment because the detected information is made to form patterns in information handling. The pulse generator 10 is also connected to a counting device 24 which may be any conventional electronic divider. In the preferred embodiment of the present invention, a scale of 8 divider is utilized for providing an output pulse at a rate equal to one-quarter of the repetition rate of the pulse generator 10, and is utilized for producing a second output equal to a repetition rate of one-eighth of the frequency of operation of the generator 10. It is, of course, understood that other scales of division could have been used and that the number of dividing stages utilized will be dependent upon the measuring use situation.

The divider 24 drives a pair of gates 26 and 28 at a rate equal to one-fourth of the repetition rate of the generator 10. The gates 26 and 28 are connected in parallel to the output of the amplifier 22 and thus the detected pulse signals shown at the output of the amplifier 22, and in FIGURE 2*c*, are impressed in parallel across the inputs of the gates 26, 28. The gates may be of any conventional design, e.g., AND gates, and are utilized for the purpose of alternately passing a specific number of pulses, in equal time periods, from the amplifier 22 to subsequent circuits. The divider 24 opens gate 26 for a period of four pulses and then simultaneously closes gate 26 and opens gate 28 letting gate 28 pass the next series of four pulses. The outputs of gates 26 and 28 are shown in FIGURES 2*d* and 2*e* respectively. Thus, the gates 26 and 28, operating from the divider 24, divide the detected pulse information into a pair of time separated groups and route these groups over separate channels as represented by the wave forms, shown in FIGURES 2*d* and 2*e*.

Gate 26 is connected in series with an accumulator 30 and gate 28 is connected in series with an accumulator 32. Each accumulator acts to sum the pulses entered into it during a four pulse period as a step function with the highest level signal being held for an additional four pulse period by the accumulator. The accumulator 30 receives a pulse group as shown in FIGURE 2*d* and adds the pulses of the group as shown in FIGURE 2*f*. The accumulator then holds the group for an additional four pulse period, that is, for the full scale of the divider 24. After each period of 8 pulses, the divider 24 through a switch 34 resets the accumulator to zero. In a like manner, the accumulator 32 receives at its input a group of four pulses passed by gate 28 as shown in FIGURE 2*e*. These pulses are accumulated, again in a step fashion as shown at FIGURE 2*g*, and are held for an additional four pulse period whereupon the accumulator 32 is reset to zero by a switch 38 operating from the divider 24.

In the alternative the gates 26 and 28 may be utilized to divide a continuous signal at *c* into time displaced groups which groups would be applied to the accumulators 30, 32 respectively. In such a case the signals shown in FIGS. 2*d* and 2*e* would have the peaks of the pulses joined by signal curves which curves respectively represent chopped portions of the curve at *c*. For measuring equipment and the like utilizing analog voltages or currents at *c* the pulse generator 10 and divider 24 would be replaced by a timer of conventional design to control the operation of the gates 26, 28 and the accumulators 30, 32. The diagrams shown in FIGS. 2*f* and 2*g* would be changed to show saw tooth functions with the slope of the functions being proportional to the amplitude of the continuous signal at *c*.

The voltages stored in the accumulators 30 and 32 are impressed upon a voltage discriminating network 38 which discriminates between the two outputs to provide as an output of the gates and accumulators the wave form shown in FIGURE 2*h*. The output consists of the higher of the two voltage levels accumulated during any given period in the accumulators. This output voltage may be connected to conventional indicator circuits for the purpose of displaying information thereon, or it may be utilized to drive machinery for varying the thickness of the target 18. It will be noted that signal 2*h* diminishes with corresponding increasing thickness of specimen.

Referring now to FIGURE 3, the circuits of the present invention are shown in a schematic diagram. The circuits shown in FIGURE 3 represent a simplified embodiment of the present invention.

The pulse generator 10 consists of a conventional relaxation oscillator of the unijunction transistor type. The output of this generator is, ideally, that shown in FIGURE 2*a* and is coupled to the modulator 14 which in the preferred embodiment of the present invention consists of a silicon controlled rectifier 40 connected in series with the primary 42 of a step-up transformer 44 and a storage capacitor 46. The capacitor 46 is charged from a source of voltage through a regulator consisting of the transistors 48, 50 and 52 and their associated bias circuitry. Since the preferred embodiments of this invention are being described with respect to a device for determining the thickness of an article under test, the capacitor charge regulator utilizes a voltage dividing network consisting of the potentiometer 54 in series with a resistor 56 connected across the source of DC power as a thickness control to control the pulse voltage supplied to the source of X-rays 12. The voltage divider is utilized for the purpose of setting the base bias on the transistor 52. Transistor 52 controls current flow through the transistors 48 and 50 by regulating base bias on transistor 50 to regulate the voltage drop at a junction 51 connecting the base electrode of transistor 50 to the collector electrode of transistor 51. By regulating the charge on the capacitor 46, the amplitude of the voltage pulse, which is developed in the primary 42 of the transformer 44 upon discharge of the capacitor 46 through the primary 42 and the silicon controlled device 40 to cause the SCR to conduct. The pulse is stepped up in the transformer 44 and applied between cathode and anode of a conventional X-ray tube 58. Filament voltage is applied to the tube 58 through a transformer 60, the primary of which is connected to a conventional supply through a conventional filament regulator 62.

The specimen 18 has not been shown in FIGURE 3; however, it would be interposed between the anode of the X-ray tube 58 and a fluorescent screen 64. The fluorescent screen 64 constitutes an element in the receiver 20 of FIGURE 1. When X-rays pass through the specimen 18, they impinge upon the fluorescent screen causing it to fluoresce and to produce light, the intensity of which is proportional to the intensity of X-rays on the screen. The light emitted from the screen 64 is detected by a photomultiplier tube 66 to produce an electrical signal which is proportional in magnitude to the amount of light impinging on the photomultiplier target.

The signal output of the photomultiplier tube is amplified in a conventional cascaded amplifier 22, the output of which is a series of pulses as shown in FIGURE 2*c*.

The output of the relaxation oscillator is also coupled through a transistor 70 to the input of the scale of eight divider 24. The scale of eight divider 24 comprises three cascaded flip-flops 72, 74 and 76. All three flip-flops are identical and, therefore, only flip-flop 72 has been shown. It is a characteristic of this flip-flop that for every two pulses input to the flip-flop, a single pulse output will result, thus the flip-flop 72 constitutes a scale of two divider and since it is series connected to the flip-flop 74, the combination constitutes a scale of four divider with the three flip-flops in cascade constituting the scale of eight divider 24.

The scale of four divider consisting of the units 72 and 74 in cascade is capacitively coupled to the base of a switching transistor 78. In the embodiment of the invention shown in FIGURE 3, the switch 28 of FIGURE 1 has been made part of the accumulator. In the embodiment of the invention shown in FIGURE 3, a single input switch has been utilized in place of the gates 26, 28. This switch is in series with a pair of switches to alternately transfer information to storage devices as described below. The signal pulses 2*c* outputed from the amplifier 22 by the transformer 68 are coupled through a diode 80 and a capacitor 81 to a capacitor 82 connected between the collector of switching transistor 78 and ground. The polarity of the signal derived from the scale of four divider is such that transistor 78 is turned off until the end of any given four pulse period. Therefore, the first four pulses coupled to the capacitor 82 will charge the capacitor and thus be stored in it. At the end of a four pulse period, the bias on the base of the transistor 78 is of a value to cause the transistor 78 to conduct and thus discharge the capacitor 82 through the transistor. The capacitor 81 is discharged between pulses by its associated diode, the diode adjacent to diode 80 in FIGURE 3. If instead an analog signal is applied to the accumulator, capacitor 81 may be discharged by a switching transistor similar to the transistor 78 and also operating off of the divider on a scale of four. In the alternative the capacitor 81 could be discharged by a relay contact with the relay being operated by the divider of some other device known to the art.

The capacitor 82 is also connected to the base of a transistor 84 which with its associated emitter resistor 86 constitutes a boot strap amplifier. Thus, the base of the transistor 84, and consequently, the voltage drop developed across the emitter resistor 86 will follow the charge on the capacitor 82. The voltage developed across emitter resistor 86 is stored in a pair of capacitors 88 and 90, depending upon the position of a pair of relay contacts 92 and 94. In the position shown, the relay contacts 92 are normally closed and, therefore, the voltage developed across resistor 86 will be stored in the capacitor 88.

The relay contacts 92 and 94 are operated by a relay 96 connected to the output of the scale of eight divider 24. The divider provides one pulse for every eight pulses produced by the pulse generator 10 and that pulse is coupled to the base of a transistor 98 for the purpose of activiating the relay 96. It is to be understood, of course, that the scale of eight divider could also operate transistor switches in place of the relay 96 and its respective contacts 92 and 94 to provide for alternately charging the storage capacitors 88 and 90.

Assuming that the relay 96 has just been deactivated, the capacitor 88 will discharge to a minimum value through the emitter resistor 86 utilizing a fast RC time constant and then will recharge following the charge on capacitor 82. Both capacitors 82 and 88 are discharged during the same time period. During this period of time, the voltage previously utilized for charging the capacitor 90 is retained by the capacitor 90 in that the contacts 94 have been deactivated to their normally open condition. The capacitor 88 charges for a four pulse period and then the scale of eight divider will reactivate the relay 96, causing the contacts 92 to open, thus holding the charge on the capacitor 88. At this point, the capacitor 90 will discharge through the now closed contacts 94 and the emitter resistor 86 and then will follow the emitter voltage across the resistor 86 in a charge direction for the next four pulse period.

In the alternative arrangement, described with respect to FIGURES 1 and 2, the input charging circuit to the capacitor 82 would be replaced with a constant current source. As already mentioned the pulse generator 10 and the divider 24 would be replaced with a timer. The timer would control the period during which the capacitor 88 is charged and on alternate half cycles the period during which the capacitor 90 is charged. The timer could also be utilized to control the charge period for the capacitor 82. It would be necessary that the charge period for the capacitor 88 equal the charge period for the capacitor 90. The divider provides one pulse for every eight pulses produced by the pulse generator 10 and that pulse is coupled to the base of a transistor 98 for the purpose of activating the relay 96. It is to be understood, of course, that the scale of eight divider could also operate transistor switches in place of the relay 96 and its respective contacts 92 and 94 to provide for alternately charging the storage capacitors 88 and 90.

The capacitors 88 and 90 are connected to the anodes of a pair of steering diodes 98 and 100, the cathodes of which are tied to the base of a transistor 102. Since the cathodes of the steering diodes 98 and 100 are connected together, the capacitors 88 and 90 act as a pair of DC sources connected in parallel. Therefore, the highest voltage maintained on the capacitors will prevail as the output voltage of the systems.

It should be readily apparent from the foregoing description of the preferred embodiments of the present invention that noise signals and the like are reduced by the simple expedient of averaging them through the time displaced grouping of signals representative of the measured quantity and the accumulation and comparison of groups. In this manner, the system looks for patterns of pulse amplitudes, noise and the like by definition does not produce patterns, and compares pairs of detected patterns to produce an output signal represented by the strongest compared pattern.

While preferred embodiments have been herein shown and described, applicant claims the benefit of a full range of equivalents within the scope of the appended claims.

I claim:

1. A circuit for reducing noise signals from a measuring system comprising:

(a) means for generating a series of pulses;

(b) means including a source of radiation connected to said pulse generating means for producing a series of pulses of radiant energy and for subjecting a test specimen thereto so as to produce pulse signals representative of a property of the specimen to be measured;

(c) means for detecting said series of pulses as altered by the test specimen;

(d) means, including at least two discrete storage devices, connected to said pulse generating means and to said pulse detection means for adding and storing said pulse signals representative of a property to be measured;

(e) means connected to said storage means for selecting one of said signal storage devices as a source of output signals;

(f) means connected to said selection means for utilizing the accumulated signal stored in said selected storage device; and (g) means operatively connected to said pulse generating means and to said adding and storing means for resetting said adding and storing means after the utilization means has read out an accumulated signal.

2. A circuit according to claim 1 wherein said pulse generating means comprises;

(a) a relaxation oscillator; and (b) divider means connected to said pulse generator and to said pulse adding and storing means for developing a signal to divide said pulse signals representative of a measured quantity into at least two time displaced groups.

3. A circuit according to claim 1 wherein said second mentioned means comprises:

(a) a source of radiant energy;
(b) means connected to said source of radiant energy and to said pulse generating means for developing a periodic high voltage to energize said source of radiant energy; and
(c) a test specimen for said source of radiant energy upon which the energy emitted by said source impinges and is thereby altered.

4. A circuit according to claim 3 wherein said means for developing a periodic high voltage comprises a controlled rectifier, the gate of said rectifier being connected to said pulse generating source; a transformer; a capacitor, the anode and cathode of said rectifier being connected in a series with the primary winding of said transformer and said capacitor; and means for charging said capacitor.

5. A circuit according to claim 1 wherein said detector means comprises:

(a) means positioned so as to receive radiant energy as altered by the test specimen for producing the electrical analogue of said radiant energy; and
(b) amplifier means connected to said electrical analogue producing means for amplifying said electrical analogue.

6. A circuit according to claim 1 wherein said means for adding and storing said pulse signals representative of a measured quantity comprises:

(a) means for separating said pulse signals representative of a measured property into at least two time displaced groups; and
(b) means for periodically and separately storing each of said time displaced groups.

7. A circuit according to claim 1 wherein said means for adding and storing said pulse signals representative of a measured property comprises:

(a) a switch operatively connected to said pulse generator means for separating said pulse signals representative of a measured property into at least two time displaced groups;
(b) means connected to said gate for following and amplifying said time displaced groups of signals;
(c) means connected to said following and amplifying means for separately and alternately storing said time displaced groups; and
(d) means connected between said storage means and said following and amplifying means and operatively connected to said pulse generating means for steering said time displaced groups to said storage means.

8. A circuit according to claim 1 wherein said means for adding and storing said pulse signals representative of a measured property comprises:

(a) at least two gates operatively connected to said pulse generator means and to said detection means for separating said pulse signals representative of a measured property into at least two time displaced groups; and
(b) means connected to each of said gates for periodically and alternately storing said time displaced groups.

9. A circuit for eliminating noise signals from a continuous measuring system comprising:

(a) a pulse generator;
(b) a divider connected to said pulse generator;
(c) a source of X-rays connected to said pulse generator to be triggered thereby;
(d) an article, a property of which is to be measured by said X-rays, positioned as a target for said X-rays so that said X-rays will be modulated as a result of their impingement on said article;

(e) means for detecting said modulated X-rays, and for converting said modulated X-rays into corresponding electrical signals;
(f) a pair of steering gates connected to said divider and to said X-ray detector means;
(g) a pair of accumulators, one each of said accumulators being connected to one each of said steering gates for adding and storing said signals in time displaced groups;
(h) a discriminator connected to said accumulators for selectively outputting the accumulator having the largest stored signal; and
(a) means connected to said discriminator for utilizing said output signal.

10. A circuit for reducing noise signals and the like comprising:

(a) a signal detector;
(b) first means connected to said signal detector for integrating the output of said detector for a predetermined time period;
(c) second means connected to said signal detector for integrating the output of said detector for a succeeding predetermined time period;
(d) means connected to said first and second integrating means for separately storing each of the outputs of each of said integrating means; and
(e) means connected to said storing means for selectively using the greater of the integrals retained in said storing means.

11. A circuit according to claim 10 wherein the integrating period of said second named means equals the predetermined integrating period of said first named means.

12. A circuit for reducing noise signals and the like comprising:

(a) a pulse detector;
(b) first means operatively connected to said pulse detector for adding and storing as a first group a fixed number of pulses;
(c) second means operatively connected to said pulse detector for adding and storing as a second group a fixed number of pulses; said second group succeeding said first group in time; and
(d) means connected to said first and second means for indicating the sum of said first and second groups.

13. A circuit for reducing noise signals and the like comprising:

(a) a source of signals;
(b) first means connected to said source of signals for integrating the output of said source for a predetermined time period;
(c) second means connected to said source of signals for integrating the output of said source for a succeeding predetermined time period;
(d) means connected to said first and second integrating means for separately storing each of the outputs of each of said integrating means.

14. A measuring circuit for reducing the effects of noise on signals comprising:

(a) a source of signals;
(b) a plurality of means for integrating signals from said source, each of said signal integrating means being operatively connected in sequence to said source for a predetermined interval of time such that each integrating means successively integrates signals from said source during the predetermined period each said integrating means is connected to said source;
(c) Means connected to each of said integrating means for separately storing each of the outputs of each of said plurality of integrating means; and
(d) Means connected to said storing means for selectively utilizing the stored output of one of said integrators.

(References on following page)

References Cited

UNITED STATES PATENTS

| | | | |
|---|---|---|---|
| 2,991,364 | 7/1961 | Goodman | 250—83.3 |
| 3,234,472 | 2/1966 | Ebeling et al. | 328—147 X |
| 3,372,276 | 3/1968 | Reynolds et al. | 250—83.3 |

RALPH G. NILSON, Primary Examiner

M. J. FROME, Assistant Examiner

U.S. Cl. X.R.

250—43.5, 71.5, 83, 83.6; 328—151, 186